(12) United States Patent
Zimmermann et al.

(10) Patent No.: US 9,035,565 B2
(45) Date of Patent: May 19, 2015

(54) ADAPTIVE POWER FACTOR CORRECTION FOR A LIGHTING LOAD CIRCUIT

(75) Inventors: Michael Zimmermann, Heiligkreuz (CH); Dominique Combet, Glarus (CH)

(73) Assignee: Tridonic GmbH & Co. KG, Dornbirn (AT)

( * ) Notice: Subject to any disclaimer, the term of this patent is extended or adjusted under 35 U.S.C. 154(b) by 706 days.

(21) Appl. No.: 13/129,068

(22) PCT Filed: Nov. 13, 2009

(86) PCT No.: PCT/EP2009/008106
§ 371 (c)(1),
(2), (4) Date: Jun. 16, 2011

(87) PCT Pub. No.: WO2010/054834
PCT Pub. Date: May 20, 2010

(65) Prior Publication Data
US 2011/0241569 A1    Oct. 6, 2011

(30) Foreign Application Priority Data
Nov. 14, 2008  (DE) .......................... 10 2008 057 333

(51) Int. Cl.
H05B 41/16 (2006.01)
H05B 33/08 (2006.01)

(52) U.S. Cl.
CPC ........ H05B 33/0815 (2013.01); H05B 33/0824 (2013.01); H05B 33/0851 (2013.01); Y02B 20/346 (2013.01)

(58) Field of Classification Search
CPC ............... Y02B 70/126; Y02B 20/346; H05B 33/0815; H05B 33/0824; H05B 33/0851; H02M 1/4225; H02M 2001/007; H02M 3/33507
USPC .......................... 315/247, 307, 308, 224, 360
See application file for complete search history.

(56) References Cited

U.S. PATENT DOCUMENTS

| 8,212,491 B2 * | 7/2012 | Kost et al. ...................... 315/247 |
| 2005/0218838 A1 * | 10/2005 | Lys ............................... 315/291 |
| 2008/0018261 A1 * | 1/2008 | Kastner ......................... 315/192 |
| 2008/0224629 A1 * | 9/2008 | Melanson ..................... 315/247 |

FOREIGN PATENT DOCUMENTS

WO  WO-2008112820 A2   9/2008
WO  WO 2008112820 A2 *  9/2008

OTHER PUBLICATIONS

International Search Report for PCT/EP2009/008106 dated Jan. 2, 2010.

* cited by examiner

*Primary Examiner* — Haiss Philogene
(74) *Attorney, Agent, or Firm* — Marshall, Gerstein & Borun LLP

(57) ABSTRACT

The invention relates to a method for operation of an actively clocked PFC circuit with a directly or indirectly connected load circuit at the output of the PFC circuit, wherein the load circuit has a lighting means, in particular one or more LEDs, wherein the PFC circuit is supplied at least with a measurement signal which reflects the power consumption of the load circuit or with an external control signal which indicates the power consumption, and a control circuit adjusts the mode of operation of the PFC circuit continuously or preferably in two or more steps, depending on the control signal or measurement signal.

36 Claims, 3 Drawing Sheets

ADAPTIVE POWER FACTOR CORRECTION FOR A LIGHTING LOAD CIRCUIT

BACKGROUND OF THE INVENTION

1. Field of the Invention

The invention relates in general to circuits for operation of lighting means, for example of gas discharge lamps, or inorganic or organic LEDs.

2. Related Technology

In many operating devices for lighting means, it is normal practice for the lighting means either to be operated at a high frequency (in particular in the case of gas discharge lamps) or else by means of pulse-width modulation (for example in particular in the case of LEDs). So-called driver circuits are provided for this purpose which, for example, may be designed in the form of a pulse-width modulator, a full-wave bridge circuit or a half-wave bridge circuit, etc. These driver circuits are normally supplied with a DC supply voltage on which a so-called ripple may be superimposed.

A so-called PFC circuit (Power Factor Correction) is often used as an active power factor correction circuit for provision of this DC supply voltage. This PFC circuit therefore produces the DC supply voltage on the basis of a normally rectified mains supply voltage.

The present invention in this case always relates to so-called actively clocked PFC circuits, that is to say circuits in which the power consumption of the PFC circuit is predetermined by clocking a switching element, such as a transistor.

When the switching element is closed, an inductance is in this case magnetized, which is then discharged (demagnetized) into an energy storage capacitor via a diode when the switch is opened. By way of example, the PFC circuit may be a step-up converter, a flyback converter or else an isolated flyback converter (in this case, the inductance has a secondary winding, via which the inductance is demagnetized via a diode into an energy storage capacitor).

A specific problem occurs when the power consumption of the load circuit which is connected to the output of the PFC circuit (this load circuit having the driver circuit and the lighting means) can vary to a very major extent, as is the case in particular when the connected lighting means are dimmed to very low dimming levels (for example 1% or less of the rating). LEDs in particular can be dimmed to a range well below 1% of the rating).

During this severely dimmed operation, the PFC circuit changes automatically and in an uncontrolled manner according to the prior art to a so-called burst mode, in which the circuit is switched on and off at a relatively low frequency, in order to avoid an impermissible excessive rise in the output voltage of the PFC circuit. This burst mode (switching on and off) has a very low frequency and in consequence causes various problems, such as instability of the DC supply voltage for the connected driver circuit, acoustic problems, and possibly flickering of the lighting means, etc.

SUMMARY OF THE INVENTION

The invention improves the behavior of an actively clocked PFC circuit when there is a different power consumption at each output thereof.

A further object of the invention is to improve the stability of the actively clocked PFC circuit, and therefore of the overall operating device, for various load conditions, and in response to fluctuations or changes in the input voltage.

A first aspect of the invention relates to a method for operation of an actively clocked PFC circuit with a directly or indirectly connected load circuit at the output of the PFC circuit. In this case, the load circuit has a lighting means, in particular one or more LEDs. The PFC circuit is supplied at least with a measurement signal which reflects the power consumption of the load circuit or with an external control signal which indicates the power consumption. A control circuit adjusts the mode of operation of the PFC circuit continuously or preferably in two or more steps, depending on the control signal or measurement signal.

In this case, dimming can be provided, preferably to below 1% of the rating, in particular when the lighting means are LEDs.

The mode of operation of the PFC circuit can be varied, for example, by varying time constants or references of the PFC circuit.

In this case, the time constants may be the time constants of a closed-loop control system for clocking a switch in the PFC circuit. The closed-loop control system is in this case preferably slowed down when the power consumption of the load circuit is low.

A switch in the PFC circuit may be clocked with pulse pauses when the power consumption of the load circuit is low ("discontinuous mode" or non-continuous current mode).

The PFC circuit can be operated on the basis of a mains voltage. When the power consumption of the load circuit is low, the PFC circuit is deliberately operated only during time periods in which the mains voltage amplitude is high, and is preferably higher than a directly or indirectly defined threshold value.

When the PFC circuit is operated on the basis of a mains voltage, when the power consumption of the load circuit is low, the PFC circuit can be clocked with a pulse train which is started at a time in the region of the peak of the mains voltage.

In this case, by way of example, the pulse train can be stopped before reaching the zero crossing of the mains voltage, and a pause is introduced until the next pulse train.

The clocking of the PFC circuit can be synchronized with the mains voltage. The PFC circuit can preferably be clocked as a function of a signal (as a nominal value preset) which is derived from the mains voltage or is synchronized to the mains voltage.

The mode of operation of the PFC circuit can be varied by varying a nominal value preset for the output voltage of the PFC circuit, which output voltage is regulated via the clocking of the PFC circuit as a manipulated variable.

When the measurement signal or control signal reflects a load circuit power consumption, which is below a predetermined threshold value, the mode of operation of the PFC circuit is varied in a discrete step.

The load circuit may have a clocked driver circuit, whose clocking can be synchronized with the clocking of the PFC circuit.

In this case, the driver circuit can be pulse-width modulated, and the driver circuit can be switched on within the duty cycle only during periods in which the PFC circuit is actively clocked by pulse trains, but not in the pulse pauses between two pulse trains.

A further aspect of the invention relates to an integrated control circuit, in particular an ASIC or microcontroller, which is designed for load-adaptive operation of a PFC circuit.

Yet another aspect of the invention relates to an operating device for a lighting means, in particular for one or more LEDs, having a control circuit which drives a PFC circuit adaptively, that is to say as a function of the load or as a function of a dimming signal, to which a preferably clocked LED driver circuit is in turn connected.

In particular, the operating device is a device which can be dimmed and to which, for example, (digital) dimming signals can be supplied via a preferably external connection, in particular a bus line or via the mains line. In this case, dimming can be provided to below 1% of the rating.

A further aspect of the invention relates to an operating device for a lighting means, in particular for one or more LEDs, having an actively clocked PFC circuit, and a load circuit which is connected directly or indirectly to the output of the PFC circuit, wherein the load circuit has a lighting means, in particular one or more LEDs, wherein the PFC circuit is supplied with at least one measurement signal, which reflects the power consumption of the load circuit or with an external control signal which indicates the power consumption, and a control circuit is designed to adjust and/or to influence the mode of operation of the PFC circuit continuously or preferably in two or more steps, depending on the control signal or measurement signal.

The mode of operation and/or the influence on the mode of operation may be chosen by an additional signal application to the multiplication input of the monitoring unit and/or of the closed-loop PFC control system for the PFC circuit.

BRIEF DESCRIPTION OF THE DRAWINGS

Further aspects, features and characteristics of the present invention will be explained in more detail in the following description of exemplary embodiments, and on the basis of the figures in the accompanying drawings, in which.

DETAILED DESCRIPTION

Figure 1:
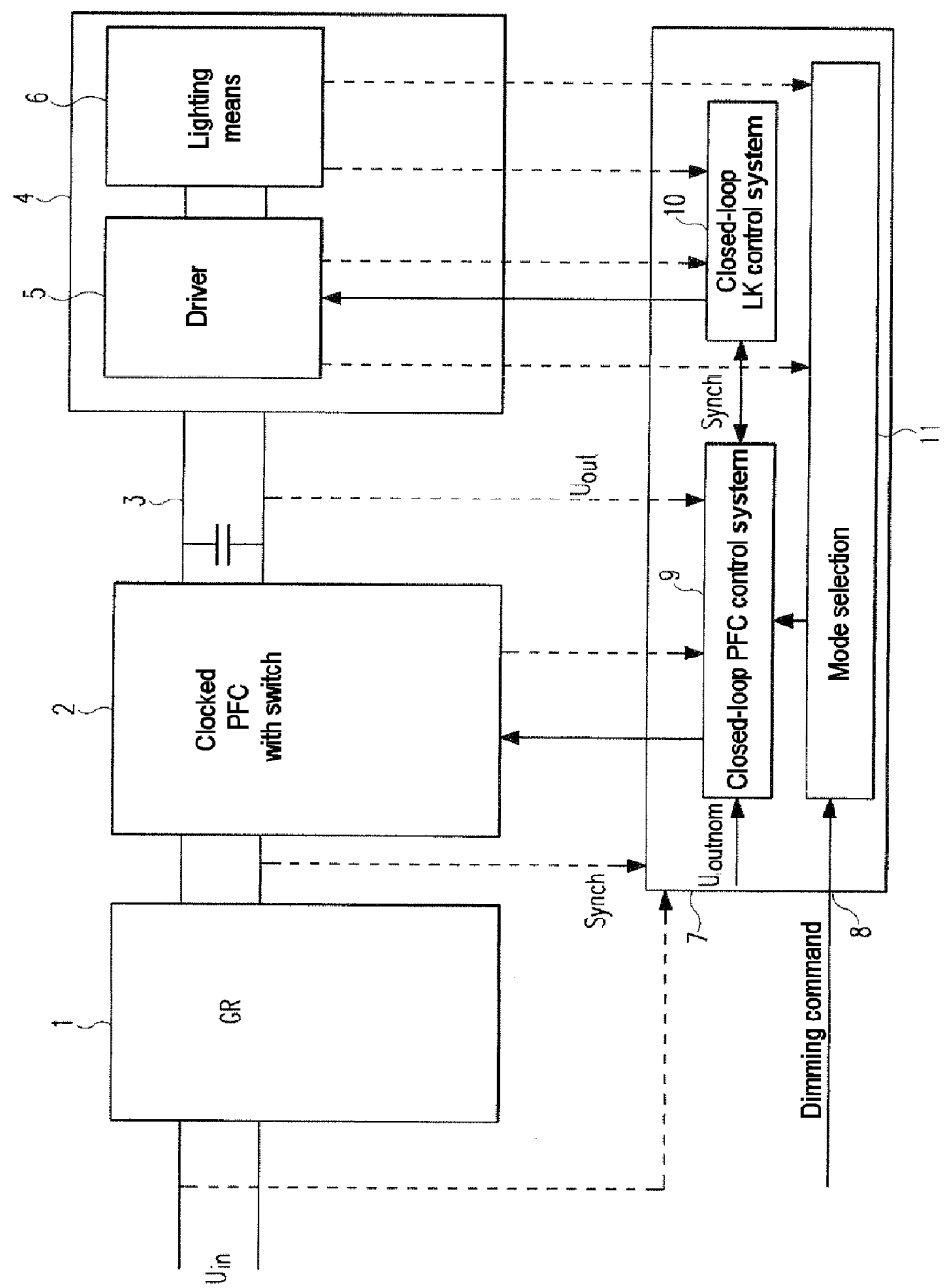
FIG. 1 in this case schematically illustrates an operating device with an adaptive PFC circuit according to the present invention.

As can be seen in FIG. 1, lighting means 6 are supplied on the basis of a voltage $U_{in}$ which, in particular, may be a mains AC voltage. This mains AC voltage $U_{in}$ may be filtered, and may then be supplied to a rectifier 1. The rectified AC voltage is then supplied to a clocked PFC circuit 2, to whose output an electrolytic energy storage capacitor 3 is often connected, in order to stabilize the output voltage $U_{out}$. This voltage $U_{out}$ is a DC supply voltage, which is then in turn supplied to a load circuit 4 which, in particular, has a driver circuit (converter) 5 and the lighting means 6 to be supplied.

Furthermore, the invention provides a control circuit 7 which, in particular, may be in the form of an integrated circuit such as an ASIC, a microcontroller or a hybrid solution thereof. It should be noted that the blocks illustrated within the control circuit 7 in FIG. 1 are arranged in an only logically related manner, but can in fact be distributed between different modules.

The control circuit 7 may have a closed-loop PFC control system 9, to which feedback signals are supplied from the area of the input voltage $U_{in}$, the area of the PFCs (for example switch current) and the output voltage Uout. The closed-loop PFC control system can also be supplied with a nominal value for the output voltage $U_{outnom}$, wherein the closed-loop PFC control system 9 can then, for example, use the clocking, in particular the so-called duty cycle of the switch in the PFC 2, as a controlled variable for closed-loop control of the output voltage $U_{out}$ at the nominal value preset $U_{outnom}$.

Furthermore, closed-loop load circuit control 10 can be provided in the control circuit 7. This closed-loop load circuit control 10 can be supplied with measurement signals from the area of the driver circuit 5, and from the area of the lighting means (lighting means voltage, lighting means current, lighting means power, lighting means brightness, etc.). The closed-loop load circuit control 10 can then normally use clocking of switches in the driver circuit 5 as a controlled variable in order, for example, to regulate a parameter which reflects the lighting means power at a nominal value preset. The closed-loop load circuit control 10 may, however, also detect only measurement signals from the area of the driver circuit 5, and pass these to the closed-loop PFC control system 9.

A mode selection 11 logic block is also provided in the control circuit 7, to which measurement signals can likewise be supplied from the area of the PFCs, the driver circuit 5 and the lighting means 6 and, alternatively or in addition to this, can also be supplied with information relating to a dimming level preset 8. By way of example, the dimming level preset 8 can be provided via dimming signals which can be supplied to the operating device via a bus line or via the mains line. For example, digital dimming signals can be supplied. The mode of operation of the PFCs can be varied continuously or in steps, in at least two different modes of operation, by means of this mode selection unit 11. By way of example, an additional synchronization signal can be supplied to the closed-loop PFC control system 9 as a function of the dimming level preset 8 that is supplied (for example only in the case of dimming level presets 8 which preset a dimming level other than the maximum value).

In principle, the present invention now provides for the PFC circuit 2 or the associated control circuit 7 to automatically identify (by means of feedback signals) or else to identify via the applied external signal that the power consumption of the load circuit 4 is low (that is to say below a predetermined threshold value). The mode of operation of the PFC circuit 2 can then be set adaptively to this identified state (low load).

For example, time constants of the PFCs such as the time response of the closed-loop PFC control system 9 may be varied as a function of the load consumption of the load circuit. For this purpose, for example, the control loop 9 can be slowed down if the power consumption of the load circuit 4 is identified as being low, or is predetermined to be low.

A further possibility is for the mode selection unit 11 to preset clocking of the switch in the PFC 2 in the form of pulse trains, wherein relatively long pulse pauses are provided between the pulse trains ("discontinuous mode" or burst mode).

The invention also preferably provides for switched-on cycles (pulse trains) to be selectively activated in a deliberate manner in the case of a known or predetermined low power consumption in the load circuit 4 only in the range in which, in terms of time, the amplitude of the input voltage $U_{in}$ (mains voltage) is high, that is to say preferably greater than a predetermined threshold value. Therefore, since the mains input voltage is relatively high in this time period, the PFC circuit will consume little current in this time period.

Therefore, according to the invention, the selective operation of the PFCs in the "low load" mode of operation can be synchronized with the mains input voltage.

For this purpose, as is illustrated schematically in FIG. 1, the control circuit 7 is supplied with a synchronization signal which reflects the profile of the mains input voltage or a signal which is dependent thereon, and that can be tapped off upstream of the rectifier, between the rectifier and the PFC or else from the area of the PFC 2. The mode of operation of the PFC circuit 2 can also be varied for the "low load" mode by selective application of a synchronization signal only in a "low load" mode.

A further alternative or additional possible way to vary the mode of operation of the PFC circuit 2 for the "low load" mode is to reduce the output voltage $V_{out}$ from the PFC circuit 2 when, for example, the dimming levels are low, for example by appropriately reducing the nominal value for the output voltage $U_{outnom}$. This mode of operation could then be set for the lighting means 6, in particular LEDs, both via the amplitude of the output voltage $U_{out}$ and via the closed-loop load circuit control system 10, for example by setting a duty ratio (PWM modulation) for a switch in the LED driver 5.

According to yet another aspect of the invention, the driver circuit 5 is also adaptively set to low dimming levels. In this case, for example, the switching-on flanks of the pulses for a PWM drive for a switch in the driver circuit 5 are synchronized to the switching-on flanks or at least to the first switching-on flank in the pulse train (pulse packets) of the PFC circuit 2. This ensures that a clearly defined (and regulated) supply voltage $U_{out}$ is produced for the driver circuit 5 at the time of the switching-on flank of the PWM drive and throughout the time for which the PWM modulation of the driver circuit 5 is switched on, by means of simultaneous active pulse packets of the PFC circuit 2.

In contrast, it is possible for the supply voltage $U_{out}$ (output voltage from the PFC circuit 2) not to be constant at least in the area of the time during which the PWM modulation for the switch in the driver circuit 5 is switched off, and, for example, to fall because the PFC circuit 2 is not clocked during this time period.

The frequency of the pulse trains for the PFC circuit 2 is preferably considerably greater than twice the mains frequency in this area at, for example, more than 100 Hz, resulting in any change in the brightness of the lighting means (flickering) scarcely any longer being perceptible for the human eye.

The clocking of the PFC circuit 2 can be synchronized with the mains voltage. The PFC circuit 2 can preferably be clocked as a function of a signal (as a nominal value preset), which is derived by the control circuit 7 from the mains voltage or is synchronized to the mains voltage. In particular, derivation from the mains voltage can be carried out by means of the mode selection 11, if the dimming level preset 8 is transmitted via the mains line.

Figure 2:
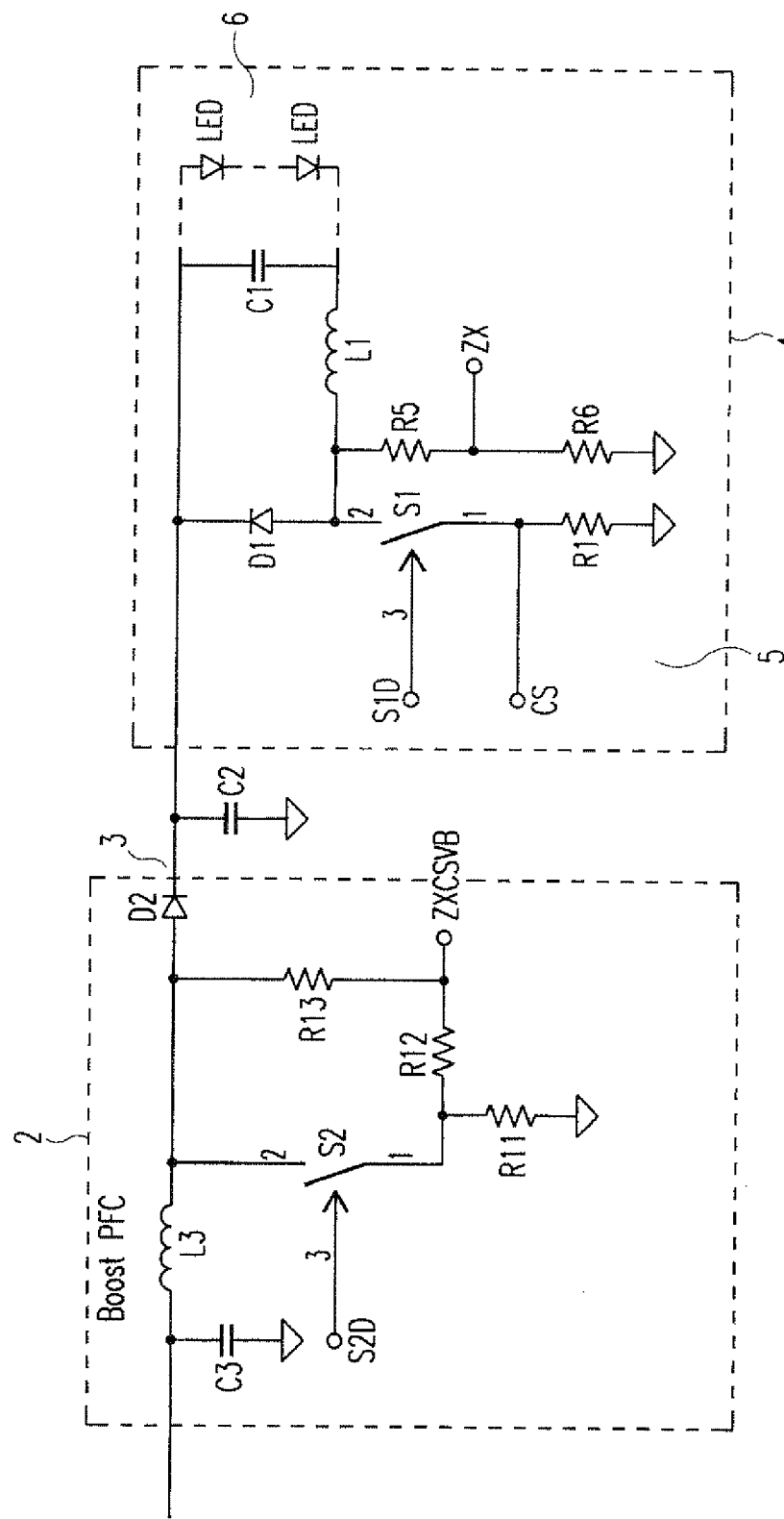
FIG. 2 shows, in detail, an example of the design of a PFC circuit with a load circuit with an LED driver (converter) and LEDs as the lighting means.

FIG. 2 shows the design of a PFC circuit 2 and of a driver circuit 5 for supplying LEDs as the lighting means 6.

The PFC circuit 2 essentially has an inductance L3 which is magnetized when the switch (transistor) S2 is closed in response to a drive command S2D, which is predetermined by the (preferably integrated) control circuit 7.

When the switch S2 is then opened, the energy in the magnetized inductance L3 is discharged via a diode D2 to the energy storage capacitor C2.

On the one hand, when the switch S2 is closed, the voltage drop across the measurement resistor (shunt) R11 and therefore the current through the switch S2, can be measured at the pin ZXCSVB. When the switch S2 is open, the output voltage $U_{out}$ can be measured at this pin.

The voltage drop across the measurement resistor (shunt) R11 and therefore the current through the switch S2 can additionally or alternatively be measured at the pin CR.

The driver circuit 5 has a further switch S1, and is in the form of a buck converter. The current through the switch S1 can then be supplied by means of a measurement resistor (shunt) R1 to a pin CS of the control circuit 7. A control signal for the switch S1 is output by means of the control circuit 7 at the pin S1D.

When the switch S1 is closed, the current flows through the light-emitting diodes and a coil L1, and rises essentially linearly with the magnetization of the coil. When the switch S1 is switched off, the energy in the coil L1 is once again dissipated essentially linearly by current flowing through the LEDs and the free moving diode D1, until the switch S1 is finally switched on again. The time at which the magnetization of the coil L1 has essentially been dissipated, and the current therefore no longer continues to flow through the freewheeling path (diode D1, LED path, L1) can be determined at a measurement point and pin ZX, by means of the voltage divider R5, R6.

Figure 3:
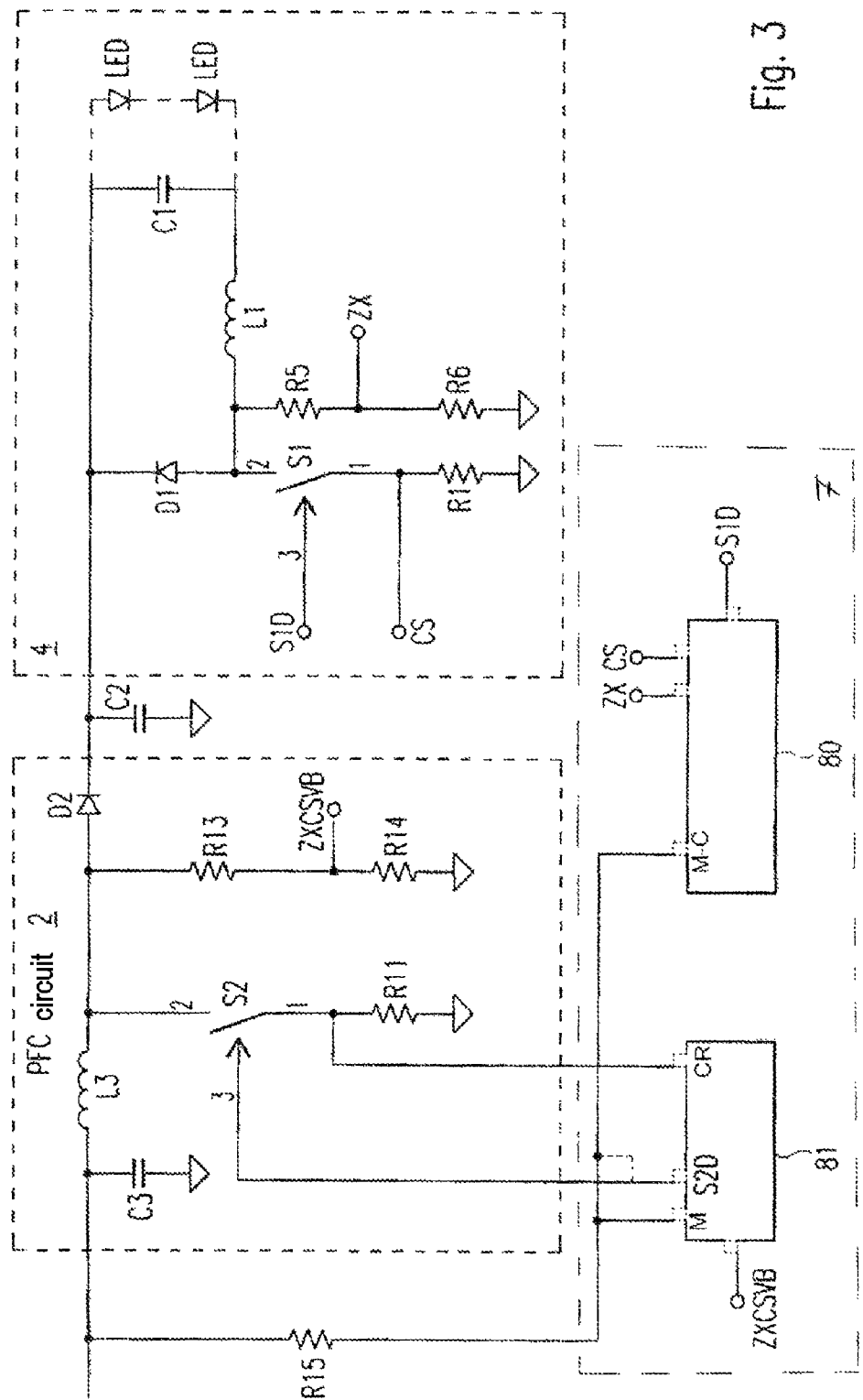
FIG. 3 shows, in detail, a further example of the design of a PFC circuit with a load circuit with an LED driver (converter) and LEDs as the lighting means.

FIG. 3 shows an example of a drive circuit for operating at least one LED, and a circuit for power factor correction according to the exemplary embodiments shown in FIGS. 1 and 2, with the drive circuit being controlled by a control unit 80.

The control circuit 80 can switch the circuit for power factor correction (PFC circuit 2) selectively to an mode of operation other than the normal mode of operation, as a function of the applied brightness command or load state. The control unit 80 therefore corresponds to the closed-loop load circuit control system 10 in FIG. 1, and the monitoring unit 81 corresponds to the closed-loop PFC control system 9 in FIG. 1. The control unit 80 and the monitoring unit 81 together form the control circuit 7.

The PFC circuit 2 has essentially one inductance L3, which is magnetized when the switch (transistor) S2 is closed in response to a drive command S2D, which is preset by the (preferably integrated) control circuit 7.

When the switch S2 is then opened, the energy in the magnetized inductance L3 is discharged via a diode D2 to the energy storage capacitor C2.

When the switch S2 is open, the output voltage $U_{out}$ can on the one hand be measured at the pin ZXCSVB, while on the other hand the time of demagnetization of the inductance L3 can also be determined at this pin.

The driver circuit 5 has a further switch S1, and is in the form of a buck converter. The current through the switch S1 can be supplied by means of a measurement resistor (shunt) R1 to a pin CS of the control circuit 7. A control signal for the switch S1 is output by the control circuit 7 at the pin S1D.

When the switch S1 is closed, the current flows through the light-emitting diodes and a coil L1, and rises essentially linearly with the magnetization of the coil. When the switch S1 is switched off, the energy in the coil L1 is once again dissipated essentially linearly by current flowing through the LEDs and the freewheeling diode D1, until the switch S1 is finally switched on again. The time at which the magnetization of the coil L1 has essentially dissipated, and the current is therefore no longer passed on through the freewheeling path (diode D1, LED path, L1) can be determined at a measurement point and pin ZX by means of the voltage divider R5, R6.

The control circuit 80 drives the driver circuit 5 and can also influence, for example activate or deactivate, the monitoring unit 81 of the circuit for power factor correction 2 (PFC circuit 2).

However, the control circuit 80 can also detect only measurement signals from the area of the driver circuit 5, and correspondingly influence the monitoring unit 81.

In this example, the monitoring unit 80 carries out the closed-loop PFC control (as already mentioned, this corresponds to the closed-loop PFC control system 9 in FIG. 1).

The different mode of operation may be a burst mode (clocking with pulse pauses). The burst mode (clocking with pulse pauses) can be synchronized to the mains voltage. The burst mode (clocking with pulse pauses) can be synchronized by a multiple of the mains voltage.

The influence of the monitoring unit 81, for example the deactivation, can be provided by additional signal application to one of the detection connections of the monitoring unit 81 in the circuit for power factor correction 2. The influence on the monitoring unit 81 may be dependent on the applied brightness command (that is to say the dimming level preset) or the load state.

Setting to the different mode of operation can be carried out by deactivation of the circuit for power factor correction at times. The duration of the pauses in the burst mode (clocking with pulse pauses) may be dependent on the applied brightness command or load state. The duration of the burst packets (pulse trains) when in the burst mode (clocking with pulse pauses) may be dependent on the applied brightness command (that is to say the dimming level preset) or the load state. The duration of the pauses when in the burst mode (clocking with pulse pauses) may be reduced as the brightness rises or as the load rises. The duration of the burst packets (pulse trains) when in the burst mode can be increased when the brightness rises or the load rises. The duration of the pauses and/or the duration of the burst packets (pulse trains) can be varied in steps in the burst mode.

The repetition rate of the burst packets (pulse trains) may be above the perceptibility limit when in the burst mode (clocking with pulse pauses). By way of example, a repetition rate in the range from 150 Hz up to 450 Hz may be selected.

The mode of operation may be selected and the mode of operation influenced by additional signal application to the multiplication input M of the monitoring unit 81 for the circuit for power factor correction (PFC circuit) (that is to say at one of the detection connections of the monitoring unit 81). In this example, the measurement is carried out by means of the multiplication input M via the resistor R15 which is connected to the mains voltage and, furthermore, a signal is applied to the multiplication input M, as an external control signal, from the control unit 80. The signal can be applied to the multiplication input M of the monitoring unit 81 via a control connection M-C on the control unit 80. By way of example, the control unit 80 can monitor and detect the mains voltage, in particular its waveform, via the control connection M-C or via a further input. By way of example, the mode of operation can therefore be selected by deactivation of the monitoring unit 81. However, the drive for the switch S2 can also be directly influenced (for example deactivated).

The circuit for power factor correction (PFC circuit) can be activated continuously for maximum brightness or for the maximum load. The influence via the control unit 80, in particular, can be deactivated for maximum brightness or maximum load.

The influence on the mode of operation by additional signal application to the multiplication input M of the monitoring unit 81 can be synchronized with the mains voltage.

The monitoring unit 81 can preferably be influenced as a function of a signal (as a nominal value preset) which is derived by the control unit 80 from the mains voltage via the control connection M-C, or is synchronized to the mains voltage. In particular, this can be derived from the mains voltage when the dimming level preset 8 is transmitted via the mains line.

The PFC circuit (circuit for power factor correction) can supply a plurality of drive circuits for operation of at least one LED.

The plurality of drive circuits can be used for operation of LEDs of different color.

A lighting system can thus be formed with an apparatus for operation of LEDs according to the invention. The lighting system can be designed such that the drive circuit is controlled by a control circuit, and the control circuit selectively switches the circuit for power factor correction (PFC circuit) to an mode of operation other than the normal mode of operation, depending on the signal from a color sensor.

The activation parameters for the different mode of operation can be set or varied by a control command for the control circuit.

This therefore allows a method for operation of LEDs in which a control circuit switches the circuit for power factor correction selectively to an mode of operation other than the normal mode of operation, as a function of the applied brightness command or load state.

The additional mode of operation which is not the normal mode of operation allows the lighting system to be operated in an extended brightness range, therefore providing the user with a more flexible lighting system. Particularly for applications with color mixing, a very wide brightness range is advantageous in order to achieve as wide a range of available mixing ratios as possible.

The invention claimed is:

1. A method for operation of an actively clocked power factor correction (PFC) circuit with a directly or indirectly connected load circuit at an output of the PFC circuit, wherein the load circuit has a lighting means, the method comprising:
    supplying the PFC circuit at least with a measurement signal which reflects the power consumption of the load circuit or with an external control signal which indicates the power consumption, and
    adjusting via a control circuit a mode of operation of the PFC circuit continuously or in two or more steps, depending on the control signal or measurement signal, wherein the mode of operation of the PFC circuit is adjusted depending on the control signal or the measurement signal by modification of a time constant of the control circuit or by switching the PFC circuit into a discontinuous operating model.

2. The method as claimed in claim 1, comprising varying the mode of operation of the PFC circuit by varying time constants of the control circuit of the PFC circuit.

3. The method as claimed in claim 2, wherein the time constants are the time constants of a closed-loop control system for clocking a switch in the PFC circuit.

4. The method as claimed in claim 1, comprising clocking a switch in the PFC circuit with pulse pauses when the power consumption of the load circuit is low.

5. The method as claimed in claim 1, comprising
    operating the PFC circuit on the basis of a mains voltage, and
    when the power consumption of the load circuit is low, deliberately operating the PFC circuit only during time periods in which the mains voltage amplitude is high.

6. The method as claimed in claim 1, comprising
    operating the PFC circuit on the basis of a mains voltage, and when the power consumption of the load circuit is low, clocking the PFC circuit with a pulse train which is started at a time in the region of the peak of the mains voltage.

7. The method as claimed in claim 6, comprising stopping the pulse train before reaching the zero crossing of the mains voltage, and introducing a pause until the next pulse train.

8. The method as claimed in claim 1, comprising
operating the PFC circuit on the basis of a mains voltage, and
synchronizing the clocking of the PFC circuit with the mains voltage.

9. The method as claimed in claim 1, comprising varying the mode of operation of the PFC circuit by varying a nominal value preset for the output voltage of the PFC circuit, which output voltage is regulated via the clocking of the PFC circuit as a manipulated variable.

10. The method as claimed in claim 1, comprising, when the measurement signal or control signal reflects a load circuit power consumption, which is below a predetermined threshold value, varying the mode of operation of the PFC circuit in a discrete step.

11. The method as claimed in claim 1, wherein the load circuit has a clocked driver circuit, the clocking of which is synchronized with the clocking of the PFC circuit.

12. The method as claimed in claim 11, in which the driver circuit is pulse-width modulated, and the method comprises switching on the driver circuit only during periods in which the PFC circuit is actively clocked by pulse trains, but not in the pulse pauses between two pulse trains.

13. A method as claimed in claim 1 wherein the lighting means comprises at least one LED.

14. The method as claimed in claim 3, comprising slowing down the closed-loop control system when the power consumption of the load circuit is low.

15. The method as claimed in claim 5, comprising deliberately operating the PFC circuit only during time periods in which the mains voltage amplitude is higher than a directly or indirectly defined threshold value.

16. An operating device for a lighting means comprising:
an actively clocked power factor correction (PFC) circuit, and
a load circuit which is connected directly or indirectly to an output of the PFC circuit, wherein
the load circuit has a lighting means,
the PFC circuit is supplied with at least one measurement signal, which reflects the power consumption of the load circuit or with an external control signal which indicates the power consumption,
a control circuit is designed to adjust and/or to influence a mode of operation of the PFC circuit continuously or in two or more steps, depending on the control signal or measurement signal, and
the mode of operation of the PFC circuit is adjusted depending on the control signal or the measurement signal by modification of a time constant of the control circuit or by switching the PFC circuit into a discontinuous operating mode.

17. The operating device as claimed in claim 16, in which the mode of operation of the PFC circuit can be varied by varying time constants of the PFC circuit.

18. The operating device as claimed in claim 16, in which a switch in the PFC circuit is clocked with pulse pauses when the power consumption of the load circuit is low.

19. The operating device as claimed in claim 16, in which the PFC circuit is operated on the basis of a mains voltage, and
when the power consumption of the load circuit is low, the PFC circuit is deliberately operated only during time periods in which the mains voltage amplitude is high.

20. The operating device as claimed in claim 16, in which the mode of operation of the PFC circuit can be varied by varying a nominal value preset for the output voltage of the PFC circuit, which output voltage is regulated via the clocking of the PFC circuit as a manipulated variable.

21. The operating device as claimed in claim 16, in which, when the measurement signal or control signal reflects a load circuit power consumption, which is below a predetermined threshold value, the mode of operation of the PFC circuit can be varied in a discrete step.

22. The operating device as claimed in claim 16, in which the mode of operation of the PFC circuit can be varied by deactivation of the PFC circuit at times.

23. The operating device as claimed in claim 16, wherein the influencing is provided by additional signal application to one of the detection connections in the monitoring unit of the PFC circuit, or by influencing the drive for the switch in the PFC circuit.

24. The operating device as claimed in claim 16, wherein the influencing is provided by additional signal application to the multiplication input of the monitoring unit in the PFC circuit or by influencing the drive for the switch in the PFC circuit.

25. The operating device as claimed in claim 16, wherein the PFC circuit is influenced as a function of a dimming level preset.

26. The operating device as claimed in claim 16, wherein
the PFC circuit is operated on the basis of a mains voltage, and
the clocking of the PFC circuit is synchronized with the mains voltage.

27. The operating device as claimed in claim 16, wherein
the PFC circuit is operated on the basis of a mains voltage, and
when the power consumption of the load circuit is low, the PFC circuit is deliberately operated only during time periods in which the mains voltage amplitude is high.

28. The operating device as claimed in claim 16, wherein
the PFC circuit is operated on the basis of a mains voltage, and
when the power consumption of the load circuit is low, the PFC circuit is clocked with a pulse train which is started at a time in the region of the peak of the mains voltage.

29. The operating device as claimed in claim 16, wherein the load circuit has a clocked driver circuit synchronized with the clocking of the PFC circuit.

30. The operating device as claimed in claim 29, in which the driver circuit is pulse-width modulated and the driver circuit is switched on only during periods in which the PFC circuit is actively clocked by pulse trains, but not in the pulse pauses between two pulse trains.

31. A lighting system, having a lighting means and an operating device as claimed in claim 16.

32. The operating device as claimed in claim 17, wherein the time constants are the time constants of a closed-loop control system for clocking a switch in the PFC circuit.

33. The operating device as claimed in claim 32, wherein the closed-loop control system is slowed down when the power consumption of the load circuit is low.

34. The operating device as claimed in claim 19, in which the PFC circuit is deliberately operated only during time periods in which the mains voltage amplitude is higher than a directly or indirectly defined threshold value.

35. The operating device as claimed in claim 27, wherein the PFC circuit is deliberately operated only during time periods in which the mains voltage amplitude is higher than a directly or indirectly defined threshold value.

36. A lighting system as claimed in claim 31, wherein the lighting means comprises at least one LED.

* * * * *